July 4, 1967 — R. DERENG — 3,329,011
SURFACE TESTING APPARATUS
Filed Aug. 18, 1964 — 2 Sheets-Sheet 1
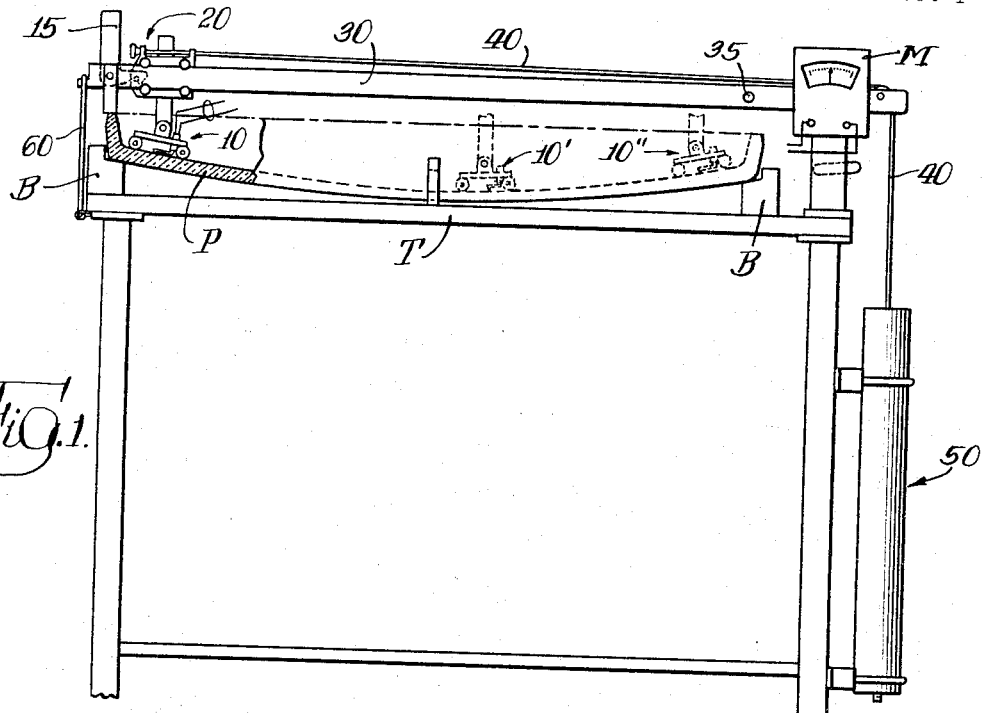
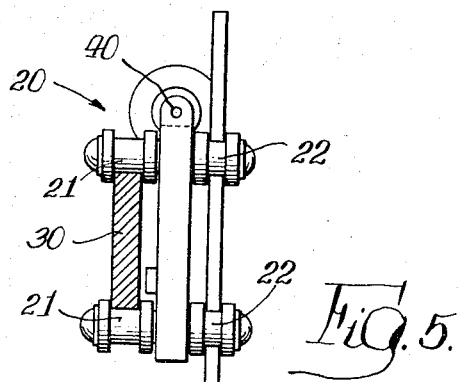
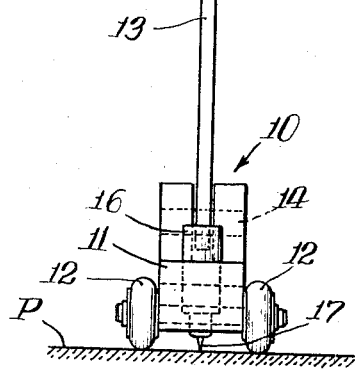
INVENTOR.
Roman Dereng,
BY Mueller & Michele
Attys.

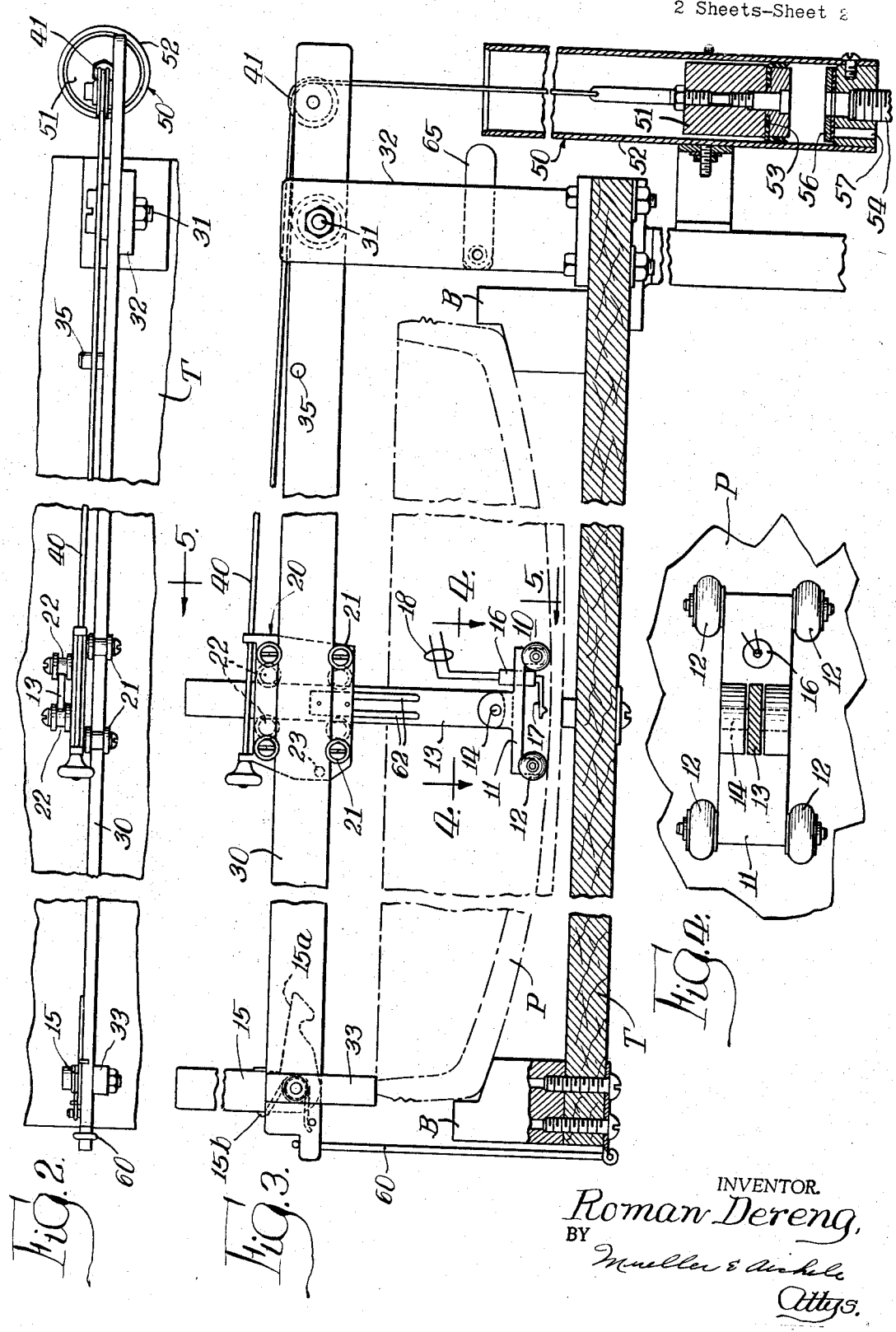

United States Patent Office 3,329,011
Patented July 4, 1967

3,329,011
SURFACE TESTING APPARATUS
Roman Dereng, Des Plaines, Ill., assignor to Motorola, Inc., Franklin Park, Ill., a corporation of Illinois
Filed Aug. 18, 1964, Ser. No. 390,370
3 Claims. (Cl. 73—105)

This invention relates to surface testing apparatus and particularly to a carriage arrangement for moving a probe over a surface, the roughness of which is to be tested.

There are many instances where it is desirable to move a probe across a surface in order to test its roughness. The probe, for example, may be a stylus in a transducer to provide an electrical signal having an amplitude that is an indication of the undulations, or the peaks and valleys, of the surface over which the stylus is moved. A particular surface to be tested may, for example, be the curved interior of a rectangular faceplate panel used in the assembly of a color cathode ray tube where the roughness of stipple of the faceplate panel must be measured to insure that it falls within required limits required for the panel to receive an acceptable coating when a phosphor containing slurry mixture is applied thereto.

It is an object of this invention to provide a simple carriage arrangement for automatically moving a probe in a predetermined path across a surface so that the roughness thereof may be tested.

Another object of the invention is to provide improved apparatus for rapidly testing the stipple on the interior surface of rectangular faceplate panels used in the assembly of color cathode ray tubes.

A further object of the invention is to provide an improved roughness testing apparatus of the type utilizing a stylus and transducer that is moved over the surface to be tested, which apparatus is simple and convenient to operate.

Briefly the apparatus of the invention utilizes an electromechanical transducer, such as a phonograph cartridge, which is pivotally and slidably mounted to be maintained in contact with a surface to be tested, such as the interior surface of the faceplate panel of a cathode ray tube. The transducer is supported on a guide assembly and a drive device automatically draws the transducer, so guided, over the test surface. An electrical indicator connected to the transducer indicates the amount of roughness to which the stylus is subjected and this can be compared to a corresponding reading of the indicator for a surface of known or standard roughness.

Specifically, the phonograph cartridge is mounted on a wheeled stylus carriage movable over the test surface. The stylus carriage is pivotally mounted on a support bar which is vertically slidable on a rail carriage. A guide rail is positioned over the test surface and the rail carriage travels therealong. With the stylus engaging the test surface through the weight of its supporting structure and being maintained upon the surface of the rolling, pivotable, and slidable structure, a cord pulley and weight assembly is used as a means to move the stylus across the test surface. The apparatus further includes pneumatic control of the weight drive to adjust the rate of stylus travel and simple adjustable provisions to permit expeditious changing of faceplate panels for a rapid testing operation.

FIG. 1 is a side elevation partly in section illustrating the apparatus of the invention;

FIG. 2 is a plain view of a part of the apparatus of FIG. 1;

FIG. 3 is an enlargement of parts of FIG. 1 to illustrate portions of the invention in more detail;

FIG. 4 is a sectional view taken along line 4—4 of FIG. 3; and

FIG. 5 is a sectional view on the line 5—5 of FIG. 3.

In FIG. 1 there is a stylus carriage 10 carrying transducer 16 with a stylus 17 (FIG. 3) and a rail carriage 20 to guide stylus carriage 10 across the curved surface, such as the interior surface of rectangular faceplate panel P mounted on table T. The gravity drive including cord 40 and dashpot controlled weight assembly 50 moves rail carriage 20 along guide rail 30 when released by latch lever 15 and until arrested by stop 35. During this movement (represented at 10, 10′ and 10″) the transducer 16 carried on the carriage 10 produces an electrical signal indicative of the surface roughness of panel P which signal is applied to meter M, to be read, e.g., as an R.M.S. voltage for comparison with a reading from a known standard panel.

The table T includes four blocks B secured to the upper surface thereof in an arrangement to hold the panel P with the interior surface thereof facing upwardly. The panel P may, for example, be the rectangular faceplate panel as used in the manufacture of a shadow mask type color picture tube. In the manufacture of such tubes it has been found that the success of depositing phosphors on the internal surface of such a panel can be dependent upon the degree of roughness of that surface. The present apparatus tests such roughness. An example of a faceplate panel of the type for which the present apparatus finds particular use is a glass panel as formed from commercial "soft" glass of the type used for standard black and white cathode ray tubes. Such a molded panel may be redimensioned within the relatively close tolerances necessary for a shadow mask type rectangular color tube in accordance with teachings not directly relevant to the present invention.

The term commercial "soft" glass is intended to include those lead-barium type glasses commonly available for use in the manufacture of black and white cathode ray tubes. Typically such glasses have annealing points in the ranges of 430° C.–460° C., softening points in the order of 655° C. or less, and thermo-coefficient of expansion in the range of $85–100 \times 10^{-7}/°$ C.

Referring now specifically to FIGS. 2–5, stylus carriage 10 includes a body portion 11 and four wheels 12 which run on the test surface of panel P. Vertically extending arm 13 is pivotally joined to body portion 11 at pin 14. Transducer 16 and stylus 17 are mounted on body portion 11 so that stylus 17 is in contact with the interior surface of faceplate panel P. Stylus 17 may conveniently be a sapphire phonograph stylus and transducer 16 the cartridge therefor. Flexible leads 18 extend from transducer 16 and are connected to an electrical indicator such as meter M. The indicator may take a form to read R.M.S., peak or average signal from the transducer, and the circuit may include an amplifier, an oscilloscope, etc., to obtain the desired information.

Rail carriage 20 has four rail wheels 21 on one side thereof which are adapted to ride along guide rail 30, and four guide wheels 22 on the other side thereof adapted to receive upwardly extending support bar or arm 13. Thus it can be seen that stylus carriage 10 follows the contour of the curved surface of panel P by the weight of arm 13 and carriage 10 plus the pivotal relation between arm 13 and carriage 10 and by the slidable action of arm 13 between guide wheels 22.

The guide rail 30 is pivotally mounted by means of bolt 31 to the frame member 32 which is attached to the table T. This places the rail 30 spaced upwardly from and generally parallel to the test surface of the panel P. A nylon rail support 33 is secured to the opposite end of the rail 30 and engages the upper edge of the panel P to support the other end of the rail.

A nylon cord 40 is joined to the rail carriage 20 and extends over a pulley 41 rotatably mounted on the end of the rail 30 which extends beyond its pivotal mounting and over the edge of the table top. This cord and pulley are part of a gravity drive arrangement for the carriage 20 which includes the weight assembly 50. This assembly comprises a weight 51 to which the cord 40 is connected and a cylinder 52 in which the weight may descend by gravitational pull. The bottom of the weight 51 carries a gasket 53 so that the rate of descent of the weight may be controlled by regulating the escape of air through the bottom of the cylinder 52. The bottom of the cylinder is enclosed and a regulating valve 54 permits the adjustment of the air escape and thus the rate of travel of carriage 20 along the rail 30.

During use of the device the guide rail 30 is retained in position by means of a tie-down member 60 which retains the rail support 33 on the edge of the panel. The carriage 20 is initially restrained against driving movement by the weight assembly through the engagement of a hook portion 15a on the end of the spring biased lever 15 which engages a pin 23 on the carriage 20. Lever 15 may thus be moved in a counterclockwise direction (FIG. 3) back against the associated bias spring 15b to release the carriage 20, and the stylus carriage 10 will thus move from left to right across the curved interior surface of the panel P. The pin 35 provides a stop for the carriage 20 after the stylus 17 has traveled across the entire test surface. As previously stated, the pivotal mounting of the stylus carriage and the weight thereof together with a slidable verical mounting of it will maintain the wheels 12 in rolling engagement on the test surface and the stylus 17 in contact therewith.

To release a panel after testing, arm 13 is raised upwardly within its mounting in carriage 20 and retained there by means of spring portions 62 which bend outwardly from and are attached to arm 13 such that when the arm 13 is raised the spring portions 62 frictionally bind the arm 13 with the surface of the carriage 20. The rail carriage 20 may be reset to its position for reuse (FIG. 1) by manually drawing it along the rail 30 until the hook 15a engages the catch 23. In doing this the dash pot action of the weight asembly 50 could present undesirable resistance to the movement of the carriage 20. However, a washer 56 is positioned in the bottom in the cylinder 52 so that it normally covers the aperture 57 except when the weight 51 is moved upwardly and then the washer 56 will raise and permit air pressure to enter the cylinder through the aperture 57. The washer 56 will return to a position of sealing the aperture 57 due to its own weight and, of course, will seal off this aperture when the weight 51 descends and air is compressed in the bottom of the cylinder when the apparatus is testing a panel.

Further in removing the panel after test, the tie-down member 60 is pivoted outwardly to release the rail 30 which can then be pivoted upwardly about the bolt 31 and the rail 30 may be retained in an upright position through engagement thereof with the spring member 65.

Accordingly, it may be seen that the above described apparatus provides a simple and effective way of rapidly checking the roughness of a test surface, such as the curved interior surface of a rectangular cathode ray tube faceplate. Apparatus is relatively simple and inexpensive in construction and may be used to give a reliable test which can be rapidly carried out on a number of panels for a stipple or roughness indication with respect to a known or standard surface roughness indication.

I claim:
1. A device for testing the roughness of a curved surface, including in combination, a table for supporting the test object with a surface to be tested facing upwardly, a pivotally mounted guide rail and means for locking the same in a fixed position spaced above the test surface and generally parallel to it, a rail carriage slidably mounted on said guide rail, gravity means for drawing said rail carriage across said guide rail including a cord attached to said rail carrier, a weight attached to said cord and a pulley for said cord positioned to cause said rail carrier to move along said guide rail to the pull of said weight, and an adjustable dash pot device coupled to said weight for pneumatically limiting the rate of movement of said rail carriage.

2. A device for testing the roughness of a curved faceplate of a rectangular cathode ray tube including in combination, a table for supporting the faceplate with the surface to be tested facing upwardly, a pivotally mounted guide rail and means for locking the same in a fixed position spaced above the test surface and generally parallel to it, a rail carriage slidably mounted on said guide rail, a support bar slidably retained by said rail carriage and extending toward the test surface by gravitational pull, a stylus carriage pivotally mounted on said support bar and having rollers to pass upon the test surface, an electromechanical sensing device including electrical indicator means and a phonograph cartridge having a stylus, said cartridge being mounted upon said stylus carrier so that the weight of said stylus carrier and the slidable relation of said support bar maintain said stylus rollingly, pivotally, and slidingly engaged with the test surface and means for moving said stylus carriage across said test surface by gravitational pull of said rail carriage along the guide rail by the fall of a pneumatically controlled weight.

3. Apparatus for testing the roughness of a curved rectangular faceplate panel used in the assembly of a color cathode ray tube, including in combination, a table for supporting the faceplate with the surface to be tested facing upwardly, a pivotally mounted guide rail and means for locking the same in a fixed position spaced above the test surface, a rail carriage slidably mounted on said guide rail, a support bar slidably retained by said rail carrier and movable toward the test surface by gravitational pull, a stylus carriage pivotally mounted on said support bar and having rollers to pass upon the test surface, an electromechanical sensing device including electrical indicator means and a phonograph cartridge having a stylus, said cartridge being mounted upon said stylus carrier so that the weight of said stylus carrier and the slidable relation of said support bar maintains said stylus engaged with the test surface, gravity drive means for said rail carrier to draw said stylus across the test surface including a cord attached to said rail carrier, a weight attached to said cord and a pulley for said cord positioned to cause said rail carrier to move along said guide rail due to the pull of said weight, and an adjustable dash pot device coupled to said weight for pneumatically limiting the rate of movement of said rail carriage.

References Cited

UNITED STATES PATENTS

| | | | |
|---|---|---|---|
| 2,678,559 | 5/1954 | Drake | 73—67.8 |
| 2,733,598 | 2/1956 | Miner | 73—105 |
| 2,914,938 | 12/1959 | Laakso | 73—105 |
| 3,068,581 | 12/1962 | Skalwold et al. | 33—174 |
| 3,208,272 | 9/1965 | Hall | 73—105 |
| 3,254,530 | 6/1966 | Ohringer | 73—105 |

RICHARD C. QUEISSER, *Primary Examiner.*

J. J. GILL, *Assistant Examiner.*